UNITED STATES PATENT OFFICE.

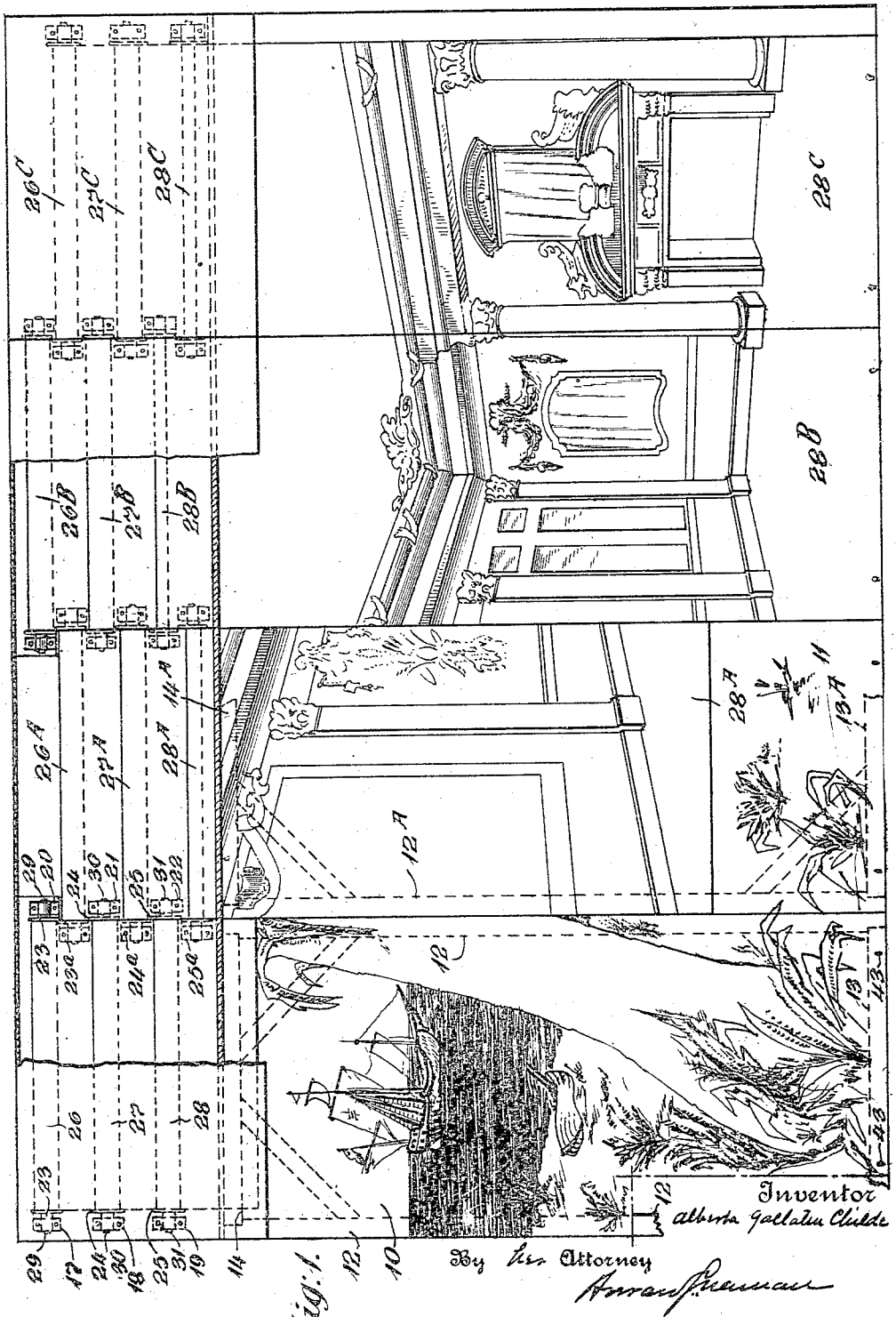

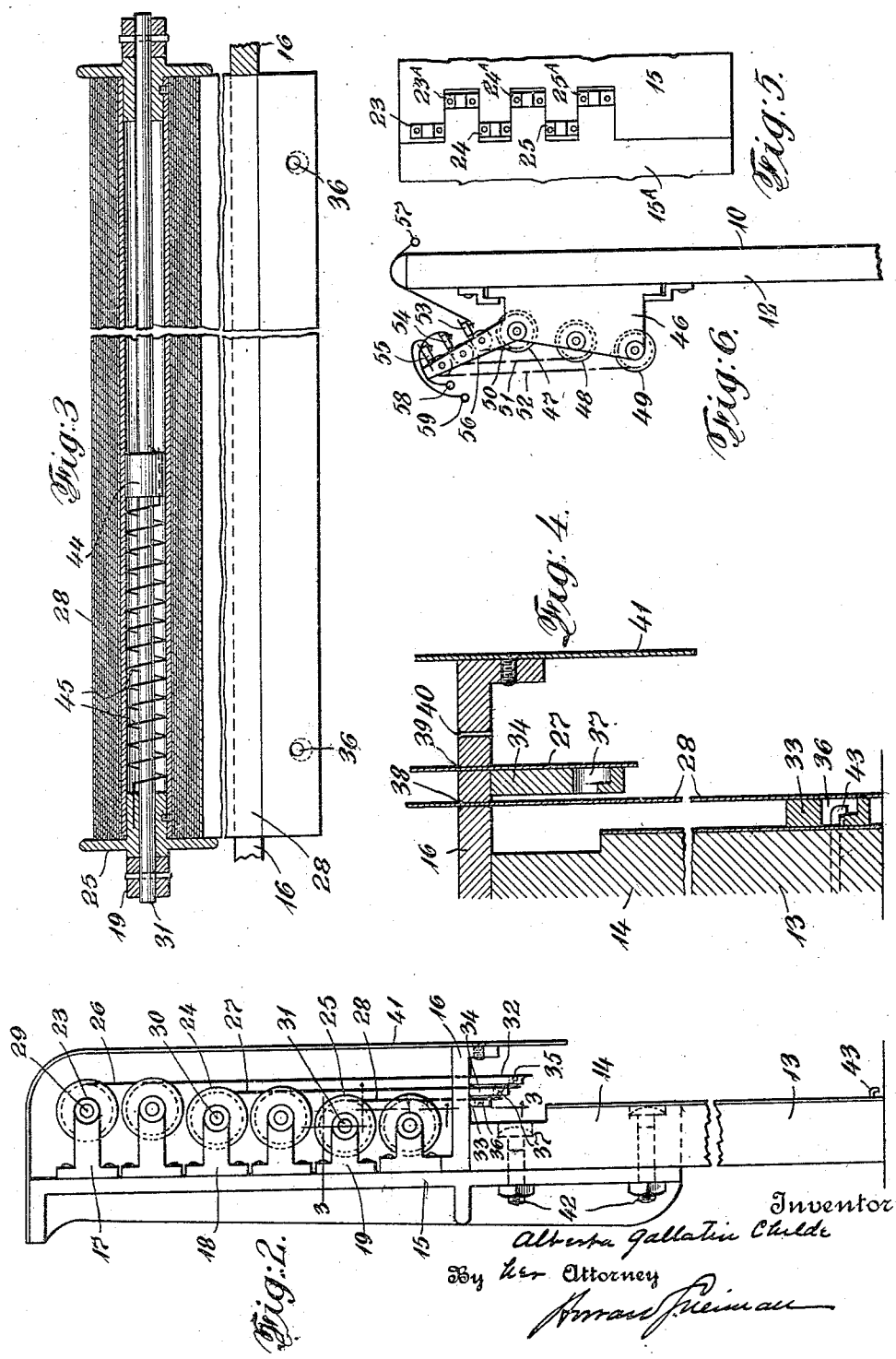

ALBERTA GALLATIN CHILDE, OF NEW YORK, N. Y.

SCENIC MECHANISM.

1,266,213.      Specification of Letters Patent.      Patented May 14, 1918.

Application filed March 29, 1917. Serial No. 158,175.

*To all whom it may concern:*

Be it known that I, ALBERTA GALLATIN CHILDE, a citizen of the United States, and a resident of New York city, in the county of New York and State of New York, have invented certain new and useful Improvements in Scenic Mechanism, of which the following is a specification.

My invention relates to scenic mechanism and refers particularly to a method for the compact assembling of a series of theatrical views.

One object of my invention is a device whereby theatrical scenery may be conveniently carried in a compact form.

Another object of my invention is a device whereby a change of scenic effects may be rapidly accomplished.

Another object of my invention is a device whereby the expense of transportation and the danger of damage to theatrical scenery may be greatly reduced.

These and other objects of my invention will be evident upon a consideration of my specification and claims.

In a theatrical production it is usually necessary to have a series of scenes, illustrating the different acts of the production, and the usually employed method of having a series of flats for each scene occasions considerable expense in shipment and loss from damage.

Each of these flats consists of a painting of a portion of a scene, mounted upon wooden framework and the scene is obtained by assembling these flats in the proper order and arrangement.

The shipment of these flats requires a large amount of space, with the incident expense of railroad fares and cartage rates and on account of their fragile nature they are subject to much damage, such as breakage of the framework and tearing of the canvas scenes.

In addition to these difficulties a considerable amount of labor and time is necessary to make the desired changes of scenery. This requires the complete knocking down of the erected scene, its storage upon the stage and the proper erection of an entirely new set of flats. This is extremely objectionable, particularly in those cases where the scenes are elaborate and the time allowed for the change is limited.

All of these objections, and others which are obvious, are eliminated by the device of my invention which allows of greatly reduced traffic expenses, protection from damage and rapidity of change.

In the modifications of the device of my invention shown in the accompanying drawings, similar parts are designated by similar numerals.

Figure 1 is a front plan view of one form of my device, partly broken away and in different stages of application.

Fig. 2 is an end view of the scenic roll mechanism.

Fig. 3 is a cross-section through the line 3—3 of Fig. 2.

Fig. 4 is a broken cross-section showing a holding means for the scene-rolls.

Fig. 5 is a fragmental back plan view of a portion showing the arrangement of the roll holders of two adjacent flats.

Fig. 6 is a side view of a modification of my scenic roll mechanism.

The views 10 and 11 are two of a series of scenic effects fixedly attached to a series of separate supports consisting of the uprights 12, 12$^A$, the bottom members 13, 13$^A$ and the top members 14, 14$^A$, thus forming a series of theatrical "flats" capable, when assembled, of producing a complete scenic effect.

My scenic roll device consists of a back plate 15, to which is attached the forwardly extended member 16. Fixedly attached to the back 15, are the roller supports 17, 18, 19, 20, 21, 22, carrying the rolls 23, 24, 25, revoluble upon the rods 29, 30, 31. Fixedly attached to the rolls 23, 24, 25 and capable of being rolled thereon are the flexible curtains 26, 27, 28 having a scenic effect thereon. Fixedly attached to the inward side of the lower portions of the curtains 26, 27, 28 are weighted members 32, 34, 33 having the offset openings 35, 36, 37 opening inwardly, each one of the weighted members being slightly broader than the one next positioned inwardly to it, to allow of the insertion of a hooked rod in either one of the openings 35, 36, 37 as desired. The curtains 26, 27, 28 pass through openings 38, 39, 40 in the member 16, the weighted members 33, 34, 35 preventing the complete upward passage of the curtains through the openings. Fixedly attached to the back 15 and the member 16 and extending outwardly and downwardly to hide the device from the sight of the audience is the shield 41. The entire roll device is fixedly attached to the top member 14 of the support by means of the bolts 42, 42. Downwardly pointed hooks 43, 43 are attached to the bottom portion 13 of the support to fit within the holes 36, 37, 38 of the weighted members 33, 34, 35 and retain the curtains 26, 27, 28 in their lowered position.

The rolls 24, 25, 26 are placed in staggered position, as shown in Fig. 5, in order that the curtains on adjacent flats will coincide along their side edges when withdrawn.

The roll mechanism, as shown in Fig. 3, consists of the rod 31 fixedly attached to the support 19. Revoluble upon the rod 31 is the roller 25. Within the roller 25 and fixedly attached to the rod 31 is the collar 44. A coiled spring 45 is situated within the hollow core of the roller 25, one end of the spring being attached to the collar 44 and the other end to the roller 25, in such a manner that the tension of the spring will have a tendency to roll the curtain 28 upon the roller 25.

Each one of the scenic flats is of the above construction, and when positioned for use the rollers are as shown in Fig. 5.

The method of use of the device of my invention is as follows: The scenes 10 and 11 of Fig. 1 having been used and it being desirous to set the next scene, the proper scenic curtains are drawn down and held in position by the pins 43, 43^A, 43^B, 43^C. In this figure, curtains 28^B and 28^C are shown completely in position, curtain 28^A is partially drawn down and curtain 28 is still wound around its roller. The method of operating the curtains is to insert the hook of a pole within the opening 36 of the curtain 28 and drawing it down and inserting the pin 43 in the opening, the spring 45 of the roller 25 having a tendency to roll up the curtain and thus maintaining it in a stretched or flat condition.

The modification of my device as shown in Fig. 6, allows of the placing of the roller mechanism behind the supporting device and thus entirely out of view of the audience. In this construction the roller supporting member 46 is fixedly attached to the rear of the support 12, and carries the staggered rollers 47, 48, 49 on which the curtains 50, 51, 52 are respectively rolled, the weighted members 53, 54, 55 preventing the curtain from passing completely through openings in the member 56. Rings 57, 58, 58 are attached to the curtains for the insertion of a hooked pole when it is desired to use the curtains. This form of construction is used in the same manner as described above.

It is evident from the above that a series of scenes can be carried by each device, as curtains 28, 28^A, 28^B and 28^C may represent one scene, and 27, 27^A, 27^B and 27^C another. It is further evident that additional flats may be added, or flats removed, as necessary, to produce the desired scene.

I do not limit myself to the particular size, number, shape or arrangement of parts as described and illustrated, all of which may be varied without going beyond the scope of my invention as described and claimed.

What is claimed, is:

1. In a device of the character described, in combination, a series of scenic flats, each flat carrying a series of rollers, each roller carrying a curtain having a scenic effect thereon, said rollers being so situated with respect to each other as to cause abutment between the edges of adjacent curtains to produce continuity of the scene thereon, and means for maintaining the curtains in a withdrawn position.

2. In a device of the character described, in combination, a series of scenic flats, each flat carrying a series of rollers staggered with respect to the rollers on the adjacent flat, a curtain carrying a scenic effect upon each roller, means tending to retain the curtains in a rolled position around the rollers, means for unrolling the curtains, and means for maintaining the curtains in an unrolled condition.

3. In a device of the character described, in combination, a series of scenic flats, each flat carrying a series of rollers at its upper portion, said rollers being situated at varied distances from the flat and staggered with respect to the rollers on the adjacent flat, a curtain carrying a portion of a scenic effect upon each roller, spring means tending to maintain the curtain in a rolled condition around the rollers, means for maintaining the curtain in a practically rolled condition, and means for maintaining the curtains in an unrolled condition.

4. In a device of the character described, in combination, a series of scenic flats, each flat carrying a series of rollers at its upper portion, said rollers being situated at varied distances from the flat and staggered with respect to the rollers on the adjacent flat, a curtain carrying a portion of a scenic effect upon each roller, spring means tending to maintain the curtain in a rolled condition around the rollers, a weighted member attached to each curtain, a recess within each weighted member, means whereby the weighted member prevents the curtain from being rolled completely around the roller, and means insertible within the recesses of the weighted members whereby the curtains may be retained in an unrolled condition.

5. In a device of the character described, in combination, a series of scenic flats, each flat carrying a roller, each roller carrying a curtain having a scenic effect thereon, said rollers being so situated with respect to each other as to cause the edges of the adjacent curtains to produce continuity of the scene thereon and means for maintaining the curtains in a withdrawn position.

6. In a device of the character described, in combination, a series of scenic flats, each flat carrying a roller staggered with respect to the roller on the adjacent flat, a curtain carrying a scenic effect upon each roller, means tending to retain the curtains in a rolled position around the rollers, means for unrolling the curtains and means for maintaining the curtains in an unrolled condition.

Signed at New York city, in the county of New York and State of New York, this 27th day of March 1917.

ALBERTA GALLATIN CHILDE.

Copies of this patent may be obtained for five cents each, by addressing the "Commissioner of Patents, Washington, D. C."